(12) United States Patent
Arafat et al.

(10) Patent No.: US 11,784,596 B2
(45) Date of Patent: Oct. 10, 2023

(54) FLEXIBLE CONTROL FOR A SIX-PHASE MACHINE

(71) Applicant: Cummins Inc., Columbus, IN (US)

(72) Inventors: Akm Arafat, Blaine, MN (US);
Bradford K. Palmer, Ham Lake, MN (US); Dakshina S Murthy-Bellur, Plymouth, MN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/631,386

(22) PCT Filed: Aug. 18, 2020

(86) PCT No.: PCT/US2020/046775
§ 371 (c)(1),
(2) Date: Jan. 28, 2022

(87) PCT Pub. No.: WO2021/034813
PCT Pub. Date: Feb. 25, 2021

(65) Prior Publication Data
US 2022/0329188 A1 Oct. 13, 2022

Related U.S. Application Data

(60) Provisional application No. 62/890,282, filed on Aug. 22, 2019.

(51) Int. Cl.
*H02P 21/00* (2016.01)
*H02P 25/22* (2006.01)
*H02P 29/028* (2016.01)

(52) U.S. Cl.
CPC .............. *H02P 21/50* (2016.02); *H02P 25/22* (2013.01); *H02P 29/028* (2013.01)

(58) Field of Classification Search
CPC ........ H02P 21/50; H02P 25/22; H02P 29/028; H02P 29/0243
See application file for complete search history.

(56) References Cited

U.S. PATENT DOCUMENTS 5,568,034 A 10/1996 Huggett
7,145,268 B2 12/2006 Edwards
(Continued)

FOREIGN PATENT DOCUMENTS

CN 101667805 A 3/2010
EP 3211787 A1 8/2017
(Continued)

OTHER PUBLICATIONS

Ahmed S. Morsy, Sensorless V/f Control with MRAS Speed Estimator for A Five-Phase Induction Machine under Open- Circuit Phase Faults, 2013, IEEE, 268-273 (Year: 2013).*
Mario J. Duran, A Simple, Fast, and Robust Open-Phase Fault Detection Technique for Six-Phase Induction Motor Drives, 2018, IEEE, 547-557 (Year: 2018).*
(Continued)

*Primary Examiner* — Bickey Dhakal
(74) *Attorney, Agent, or Firm* — Faegre Drinker Biddle & Reath LLP

(57) ABSTRACT

A method of controlling a multi-phase electric machine includes implementing a first control method to control the operation of a six-phase machine that is configured as a combination of two three-phase machines. The method also includes determining whether a fault exists in the six-phase machine. In response to determining that the fault exists in the six-phase machine, the method includes implementing a second and different control method to control the operation of the six-phase machine.

4 Claims, 3 Drawing Sheets

(56) References Cited

U.S. PATENT DOCUMENTS

| | | | |
|---|---|---|---|
| 7,277,304 B2 | 10/2007 | Shancu | |
| 7,834,579 B2 | 11/2010 | Nojima | |
| 8,283,881 B2 | 10/2012 | Gallegos-Lopez | |
| 9,160,161 B2 | 10/2015 | Li | |
| 9,787,237 B2 | 10/2017 | Choi | |
| 11,223,308 B2* | 1/2022 | Godridge | F03D 9/25 |
| 2011/0074333 A1* | 3/2011 | Suzuki | H02P 25/22 |
| | | | 318/724 |
| 2013/0200827 A1 | 8/2013 | Kezobo | |
| 2014/0009093 A1 | 1/2014 | Suzuki | |
| 2018/0244308 A1* | 8/2018 | Furukawa | B62D 5/0484 |
| 2019/0068107 A1 | 2/2019 | Mao et al. | |
| 2019/0241214 A1* | 8/2019 | Oka | B62D 6/10 |
| 2019/0356256 A1* | 11/2019 | Lamsahel | H02P 25/22 |

FOREIGN PATENT DOCUMENTS

| | | |
|---|---|---|
| WO | 2004109895 A1 | 12/2004 |
| WO | 2018195003 A1 | 10/2018 |

OTHER PUBLICATIONS

International Search Report and Written Opinion for International patent application No. PCT/US2020/046775 filed Aug. 18, 2020, dated Oct. 29, 2020.

Nanoty, A et al. "Control of Designed Developed Six Phase Induction Motor"; International Journal of Electromagnetics and Applications, 2(5); Publication [online]. 2012 [retrieved Oct. 12, 2020]. Retrieves from the Internet: ,URL: https://citeseerx.ist.psu.edu/viewdoc/download?doi=10.1.1.1081.532&rep=rep1&type=pdf>; entire document.

\* cited by examiner

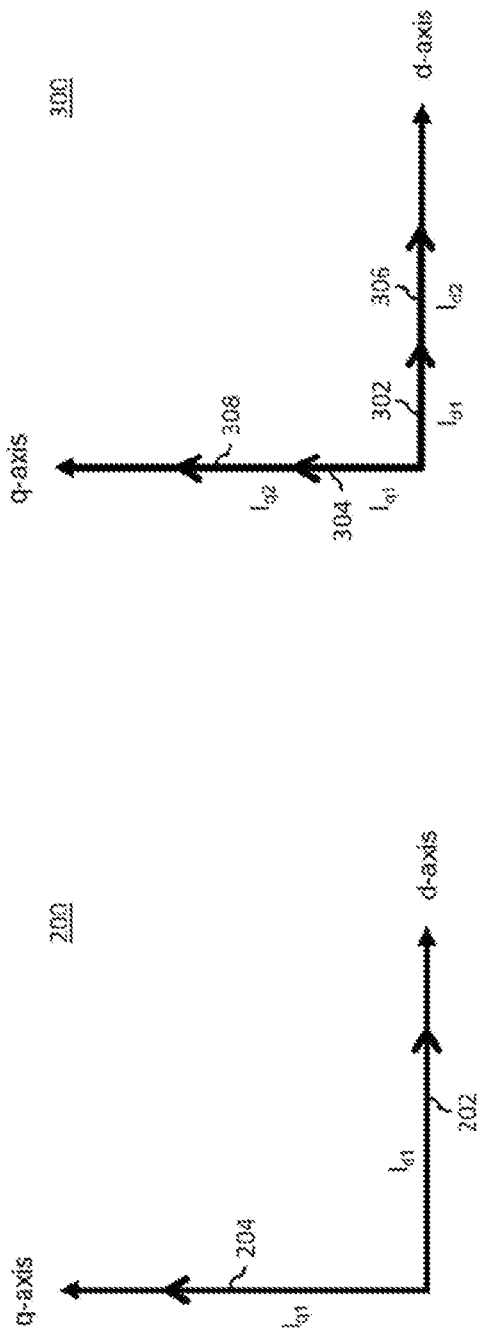

FLEXIBLE CONTROL FOR A SIX-PHASE MACHINE

CROSS-REFERENCE TO RELATED APPLICATIONS

The present application is a national phase application of International Patent Application no. PCT/US2020/046775, filed Aug. 18, 2020, which claims priority to U.S. Provisional Patent Application No. 62/890,282, filed. Aug. 22, 2019, and entitled "FLEXIBLE CONTROL FOR A SIX-PHASE MACHINE," the entire disclosure of which are expressly incorporated by reference herein.

FIELD OF THE DISCLOSURE

The present disclosure generally relates to multi-phase electric machines, and more particularly to applying different control strategies to operate a six-phase electric machine under healthy and faulty conditions.

BACKGROUND OF THE DISCLOSURE

Multi-phase electric machines are utilized in a variety of applications including electric vehicles. For example, a drive system of an electric vehicle typically includes an alternating current (AC) electric motor driven by a direct current (DC) power source (e.g., a main battery). The AC electric motor is coupled to the DC power source via a power inverter that performs switching functions to convert the DC power to AC power. One example of a multi-phase electric machine is a six-phase AC machine. The performance of a six-phase AC machine can vary greatly under healthy and faulty conditions. Accordingly, there remains a need to develop optimal control strategies with fault handling capabilities to operate the six-phase AC machine.

SUMMARY

According to one embodiment, the present disclosure provides a method by a controller to apply different control strategies to operate a six-phase machine configured as a combination of two three-phase machines. The method includes implementing a first control method to control the operation of the six-phase machine. The method also includes determining whether a fault exists in the six-phase machine. In response to determining that the fault exists in the six-phase machine, the method includes implementing a second and different control method to control the operation of the six-phase machine.

In a further aspect, the first control method is a six-phase control technique that controls all six phases of the six-phase machine, and the second control method is a three-phase control technique that controls each of the two three-phase machines individually.

In another aspect, the method includes determining which one of the two three-phase machines is experiencing the fault. To this end, one of the three-phase machines that is experiencing the fault is disabled and the second control method is applied to the remaining one of the three-phase machines not experiencing the fault. As the two three-phase machines are operated in a phase-shifted manner with their respective windings being shifted by a phase value, implementing the second control method entails referencing a new phase value such that the remaining one of the three-phase machines not experiencing the fault is operated under the same phase-shifted manner as before the occurrence of the fault.

According to another embodiment, the present disclosure provides a controller that includes a processor and a memory. The memory includes instructions that, when executed by the processor, cause the controller to implement a first control method to control the operation of a six-phase machine. The six-phase machine is configured as a combination of two three-phase machines. The processor also causes the controller to determine whether a fault exists in the six-phase machine. In response to determining that the fault exists in the six-phase machine, the processor causes the controller to implement a second and different control method to control the operation of the six-phase machine.

In a further aspect, the first control method is a six-phase control technique that controls all six phases of the six-phase machine, and the second control method is a three-phase control technique that controls each of the two three-phase machines individually.

In another aspect, the processor causes the controller to determine which one of the two three-phase machines is experiencing the fault. To this end, one of the three-phase machines that is experiencing the fault is disabled and the second control method is applied to the remaining one of the three-phase machines not experiencing the fault. As the two three-phase machines are operated in a phase-shifted manner with their respective windings being shifted by a phase value, implementing the second control method entails referencing a new phase value such that the remaining one of the three-phase machines not experiencing the fault is operated under the same phase-shifted manner as before the occurrence of the fault.

According to yet another embodiment, the present disclosure provides a system that includes a six-phase machine and a controller coupled to the six-phase machine. The six-phase machine is configured as a combination of two three-phase machines. The controller is configured to implement a first control method to control the operation of the six-phase machine. The controller is also configured to determine whether a fault exists in the six-phase machine. In response to determining that the fault exists in the six-phase machine, the controller is configured to implement a second and different control method to control the operation of the six-phase machine.

In a further aspect, the first control method is a six-phase control technique that controls all six phases of the six-phase machine, and the second control method is a three-phase control technique that controls each of the two three-phase machines individually.

In another aspect, the controller is further configured to determine which one of the two three-phase machines is experiencing the fault. To this end, one of the three-phase machines that is experiencing the fault is disabled and the second control method is applied to the remaining one of the three-phase machines not experiencing the fault. As the two three-phase machines are operated in a phase-shifted manner with their respective windings being shifted by a phase value, implementing the second control method entails referencing a new phase value such that the remaining one of the three-phase machines not experiencing the fault is operated under the same phase-shifted manner as before the occurrence of the fault.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIGS. 2-3 are graphs illustrating the implementation of control methods to operate the six-phase machine system of FIG. 1.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
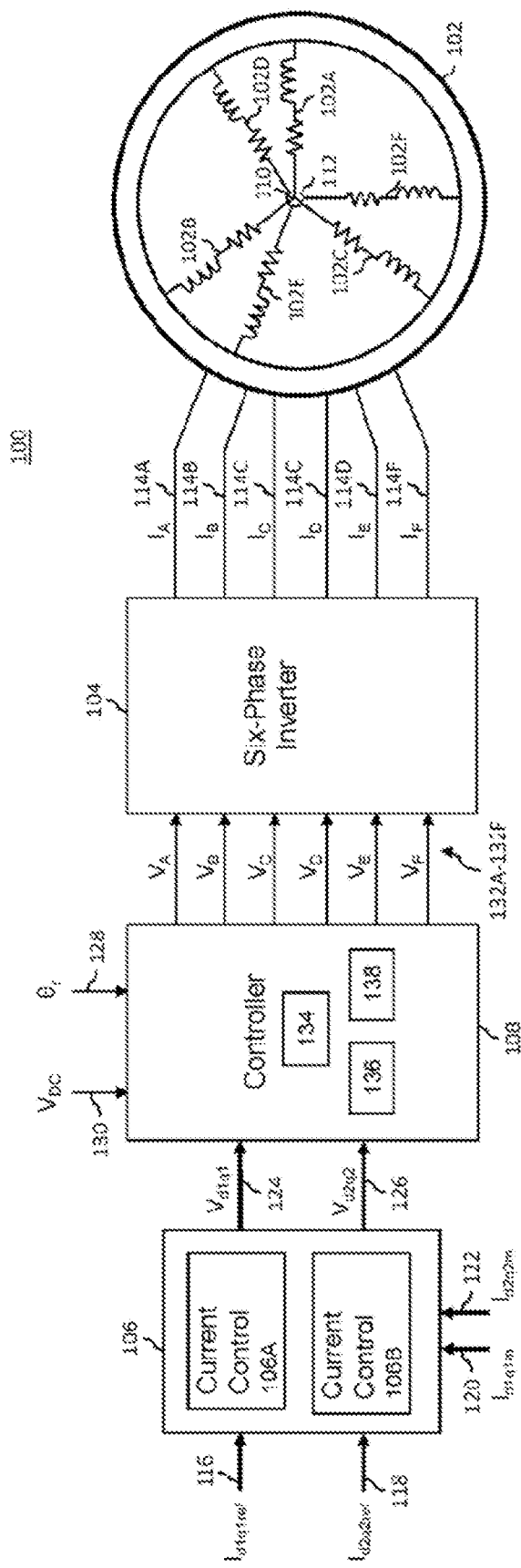
FIG. 1 is a block diagram illustrating a six-phase machine system.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Referring now to FIG. 1, a block diagram of a six-phase machine system 100 is shown including a six-phase AC machine 102, a six-phase inverter 104, a current regulator 106, and a controller 108. As used herein, the term "AC machine" refers to an AC powered device that converts electrical energy to mechanical energy or vice versa. AC machines can be classified into synchronous AC machines and asynchronous AC machines. Synchronous AC machines can include permanent magnet machines and reluctance machines. In one embodiment, six-phase AC machine 102 is a six-phase asymmetric interior permanent magnet synchronous AC motor used to provide torque in an electric vehicle. However, it should be appreciated that the disclosed embodiments can relate to other types of multi-phase electric machines in the context of other applications.

Six-phase AC machine 102 has six windings 102A-102F, with each being associated with a respective phase A-F of six-phase AC machine 102. Windings 102A-102C are coupled together at a first neutral connection 110, while windings 102D-102F are coupled together in a second neutral connection 112. First and second neutral connections 110, 112 are electrically isolated making six-phase AC machine 102 asymmetric in nature. With this configuration, six-phase AC machine 102 is set up like two individual three-phase machines. That is, windings 102A-102C comprise a first one of the three-phase machines, and windings 102D-102F comprise a second one of the three-phase machines. The two sets of windings are shifted (e.g., spatially) from one another by a phase value to improve torque performance.

Windings 102A-102F represent a stator of six-phase AC machine 102. For ease of illustration, the stator and other components (e.g., rotor, shaft, etc.) of six-phase AC machine 102 are not shown. Generally, the rotor is mounted to the shaft and the rotor is separated from the stator by an air gap. When utilized as a motor, the stator causes the rotor to rotate utilizing electrical energy thereby rotating the shaft to provide mechanical energy. On the other hand, when utilized as a generator, the shaft is rotated by an external mechanical force that causes the rotor to rotate thereby causing the stator to generate electrical energy.

Six-phase inverter 104 includes, among other things, switching devices (e.g., transistors, diodes, etc.) to appropriately switch DC voltages and provide energization to windings 102A-102F of six-phase AC machine 102 as known to those skilled in the art. Specifically, six-phase inverter 104 provides stator currents (IA-IF) 114A-114F to respective windings 102A-102F. In one example, six-phase inverter 104 is a pulse width modulated inverter.

Current regulator 106 includes current control modules 106A and 106B. Current control module 106A receives a reference current ($I_{d1q1ref}$) 116 for windings 102A-102C, and current control module 106B receives a reference current ($I_{d2q2ref}$) 118 for windings 102D-102F. Reference currents 116, 118 are in the synchronous (or rotating) reference frame, and as such, include direct-axis (d-axis), quadrature-axis (q-axis), and zero-sequence components. Reference currents 116, 118 are command signals that will cause six-phase AC machine 102 to generate a desired torque at a desired rotational speed. The use of reference current signals is known to those skilled in the art.

Current control modules 106A, 106B also receive feedback currents ($I_{d1q1m}$) 120 and ($I_{d2q2m}$) 122 from windings 102A-102C and 102D-102F, respectively. Feedback currents 120, 122 are the measured stator currents 114A-114F that have been converted to the d-axis, q-axis, and zero-sequence components in the synchronous reference frame. The process of this conversion is known to those skilled in the art.

By using reference currents 116, 118 and feedback currents 120, 122, current control modules 106A, 106B generate reference voltages for the windings in the synchronous reference frame. That is, a reference voltage ($V_{d1q1}$) 124 for windings 102A-102C, and a reference voltage ($V_{d2q}2$) 126 for windings 102D-102F. The process of this current to voltage conversion may be performed by any suitable means, such as using a proportional-integral (PI) controller. While FIG. 1 shows current control modules 106A, 106B as being separate modules, in other embodiments, current control modules 106A, 106B may be implemented as a single unit in control regulator 106. In some implementations, control regulator 106 may be part of controller 108.

Controller 108 receives reference voltages 124, 126 (e.g., from current regulator 106), a rotor/shaft position (θr) 128 (e.g., based on measured or estimated information from six-phase AC machine 102), and a DC voltage input ($V_{DC}$) 130 (e.g., from a battery). Using these inputs, controller 108 generates control voltages ($V_A$-$V_F$) 132A-132F in the stationary reference frame that are then sent to control the switching operations of six-phase inverter 104 to thereby control the outputs (e.g., 114A-114F) provided to windings 102A-102F. The process of synchronous-to-stationary conversion is known to those skilled in the art.

Controller 108 includes a fault detection unit or module 134 that receives information associated with six-phase inverter 104 and/or six-phase AC machine 102 to determine faults. For example, fault detection module 134 may receive information from sensors (e.g., current sensors) indicating various characteristics of the currents provided by six-phase inverter 104 to windings 102A-102F (e.g., amplitude measurements, root mean square measurements, etc.). As another example, fault detection module 134 may receive information from sensors indicating the conditions of windings 102A-102F. Fault detection module 134 then processes the received information and determines whether a fault or failure condition has occurred with respect to one or more phases (e.g., phases A-F) in six-phase AC machine 102. While FIG. 1 shows fault detection module 134 as being a part of controller 108, in other embodiments, fault detection module 134 can be a separate unit that is communicatively coupled to controller 108.

In one example, fault detection module 134 determines a fault in a phase of six-phase AC machine 102 when an open circuit condition is detected between a winding in six-phase AC machine 102 and a terminal connecting the winding to six-phase inverter 104. The open circuit condition may occur due to factors such as a physical disconnection (e.g., broken wires) and/or damage to the winding. In another example, fault detection module 134 determines a fault in a phase when one or more switching devices associated with that phase in six-phase inverter 104 are turned off or are operating in a faulty manner. This may be due to factors such as failures or malfunctions in the electronic circuitry. Once a fault is determined by fault detection module 134, fault detection module 134 generates information to indicate the fault. The information may indicate a fault condition causing the fault and/or which phase(s) are presently experiencing the fault. In some implementations, fault detection module 134 provides a fault signal to an output unit (e.g., a display, an indicator light, a speaker, etc.) to indicate the detected fault to an observer (e.g., an operator of an electric vehicle).

Controller 108 also includes non-transitory memory 136 having instructions that, in response to execution by a processor 138, cause processor 138 to perform the functions of controller 108 and/or fault detection module 134 as described above. Non-transitory memory 136, processor 138, and controller 108 are not particularly limited and can, for example, be physically separate.

In some embodiments, controller 108 can form a portion of a processing subsystem including one or more computing devices having memory, processing, and communication hardware. Controller 108 can be a single device or a distributed device, and functions of controller 108 can be performed by hardware and/or as computer instructions on a non-transient computer readable storage medium, such as the non-transitory memory.

In some embodiments, controller 108 includes one or more interpreters, determiners, evaluators, regulators, and/or processors that functionally execute the operations of controller 108. Interpreters, determiners, evaluators, regulators, and processors can be implemented in hardware and/or as computer instructions on a non-transient computer readable storage medium, and can be distributed across various hardware or computer-based components.

The configuration of six-phase AC machine 102 as two three-phase machines in FIG. 1 has some inherent advantages. For example, under normal or healthy conditions, the two three-phase machines can run together as a whole. However, when a fault occurs in one of the three-phase machines, the other one of the three-phase machines is still able to run. As the performance of six-phase AC machine 102 may be different under healthy and faulty conditions, controller 108 implements a different control strategy or method to operate six-phase AC machine 102 for each condition.

Under healthy conditions, controller 108 implements a first control method that is optimized for controlling all six phases of six-phase AC machine 102. In one example, all phases of six-phase AC machine 102 are projected to determine the d-axis (flux) and q-axis (torque) components for use in vector control. FIG. 2 shows a graph 200 that illustrates the implementation of the first control method, where a flux/torque transformation is performed so that only one pair of d-q components 202, 204 is used to control the flux and torque.

The first control method has several advantages. First, the fundamental d-axis components for the currents/voltages in all the phases are aligned. Second, all energies are carried using only one synchronous or rotating reference frame. Third, there is no mutual coupling between the fundamental and harmonic components for the currents/voltages, which results in lower current and torque ripples. Fourth, additional harmonic components (e.g., third harmonic d-axis current, third harmonic q-axis component, etc.) can be utilized for more advanced torque control. In some embodiments, the first control method inherits a harmonic control technique together with a fundamental control technique for advanced torque ripple minimization.

In operating six-phase AC machine 102 as two three-phase machines, the respective windings of each three-phase machine (e.g., 102A-102C and 102D-102F) are phase-shifted by a certain phase value to obtain better torque performance. In one example, windings 102A-102C and 102D-102F are shifted by 30 degrees. To account for the phase shift, controller 108 generates control voltages ($V_A$-$V_C$) 132A-132C for windings 102A-102C at 0 degrees (or −15 degrees) by using mid referencing. Similarly, controller 108 generates control voltages ($V_D$-$V_F$) 132D-132F for windings 102D-102F at 30 degrees (or 15 degrees) by using mid referencing.

Under faulty conditions (i.e., when one of the three-phase machines is lost due to a fault), the first control method is no longer suitable. As such, controller 108 implements a second control method that controls each of the two three-phase machines individually. FIG. 3 shows a graph 300 that illustrates the implementation of the second control method, where a flux/torque transformation is performed so that two pairs of d-q components 302-304 and 306-308 are used to control the flux and torque for each of the two three-phase machines individually. For the second control method, each of the components 302-308 is controlled individually. This allows for individual three-phase fault tolerant control. In some embodiments, the second control method can be used to operate six-phase AC machine 102. For example, when there is a software issue that prevents the first control method from being deployed, controller 108 can apply the second control method to operate six-phase AC machine 102 as a partial three-phase machine.

Figure 4:
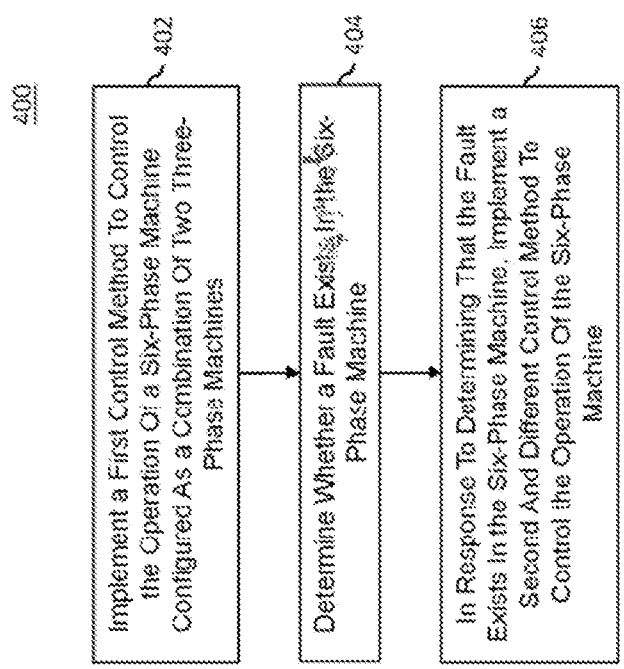
FIG. 4 is a flow chart illustrating a method for operating the six-phase machine system of FIG. 1.

Referring now to FIG. 4, a method 400 for controlling a six-phase machine (e.g., 102) is shown. Method 400 can be performed by a controller (e.g., 108). At block 402, the controller implements a first control method to control the operation of the six-phase machine which is configured as a combination of two three-phase machines. With reference to FIG. 1, windings 102A-102C can be associated with one of the three-phase machines, while windings 102D-102F can be associated with the other one of the three-phase machines. In one example, the first control method is a six-phase control technique that controls all six phases of the six-phase machine.

At block 404, the controller determines whether a fault exists in the six-phase machine. The controller includes or can communicate with a fault detection module (e.g., 134) to determine a fault condition that is causing the fault (e.g., an open circuit fault condition). The controller can generate a signal to indicate the fault condition. In one example, determining the fault entails that the controller determines which one of the two three-phase machines is experiencing the fault.

At block 406, in response to determining that the fault exists in the six-phase machine, the controller implements a second and different control method to control the operation of the six-phase machine. In one example, the second control method is a three-phase control technique that controls each of the two three-phase machines individually. When implementing the second control method, the controller disables one of the two three-phase machines that is experiencing the fault and applies the second control method to the remaining one of the two three-phase machines that is not experiencing the fault.

The two three-phase machines are operated in a phase-shifted manner in which the respective windings of the two three-phase machines (e.g., 102A-102C and 102D-102F) are shifted by a phase value. As such, when implementing the second control method, the controller references a new phase value such that the remaining one of the two three-phase machines that is not experiencing the fault is still operated under the same phase-shifted manner as before the occurrence of the fault.

As described herein, controller 108 offers a flexible control technique for operating six-phase AC machine 102 under healthy and faulty conditions. When six-phase AC machine 102 is healthy, controller 108 implements a first control method to optimize the performance from all six phases. When six-phase AC machine 102 becomes faulty, controller 108 implements a second control method to achieve individual three-phase control. In this manner, the flexible control technique maximizes drive performance while achieving fault-tolerant capabilities. This enables six-phase AC machine 102 for more reliable use in a variety of applications such as in electric vehicles and the aerospace industry.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling a six-phase machine configured as a combination of two three-phase machines, comprising:
   implementing, by a controller, a first control method to control all six phases in the six-phase machine together;
   operating the two three-phase machines in a phase-shifted condition in which windings of the two three-phase machines are shifted by a phase value;
   determining, by the controller:
      whether a fault exists in the six-phase machine, and
      which one of the two three-phase machines is experiencing the fault;
   in response to determining that the fault exists in the six-phase machine, implementing, by the controller, a second and different control method to control respective three phases in each of the two three-phase machines individually,
   wherein implementing the second control method comprises disabling one of the two three-phase machines that is experiencing the fault and applying the second control method to the remaining one of the two three-phase machines that is not experiencing the fault, and wherein implementing the second control method comprises referencing a new phase value such that the remaining one of the two three-phase machines is operated under the same phase-shifted condition as before the occurrence of the fault.

2. The method of claim 1, wherein the first control method utilizes a first pair of currents having d-axis and q-axis components and a second pair of currents having harmonic components.

3. The method of claim 2, wherein the second control method utilizes the first pair of currents having the d-axis and q-axis components.

4. A non-transitory computer readable storage medium having instructions embodied therewith, the instructions executable by a processor to cause the processor to perform the method according to claim 1.

* * * * *